United States Patent [19]

Suchoski, Jr. et al.

[11] Patent Number: 4,953,935
[45] Date of Patent: Sep. 4, 1990

[54] INTEGRATED OPTIC STAR COUPLER

[75] Inventors: Paul G. Suchoski, Jr., East Hartford; Talal K. Findakly; Frederick J. Leonberger, both of Glastonbury, all of Conn.

[73] Assignee: United Technologies Corporation, Hartford, Conn.

[21] Appl. No.: 328,940

[22] Filed: Mar. 27, 1989

[51] Int. Cl.$^5$ .............................. G02B 6/28; G02F 1/00
[52] U.S. Cl. ................................ 350/96.16; 350/96.15; 455/610
[58] Field of Search ............... 350/96.11, 96.12, 96.13, 350/96.15, 96.16; 455/610, 612; 437/16, 17, 18, 20, 24, 51; 250/227

[56] References Cited

U.S. PATENT DOCUMENTS

| | | | |
|---|---|---|---|
| 4,165,225 | 8/1979 | Auracher et al. | 350/96.28 X |
| 4,515,428 | 5/1985 | Findakly | 350/96.12 |
| 4,607,909 | 8/1986 | Sanford | 350/96.14 |

OTHER PUBLICATIONS

"Proton Exchange For High-Index Waveguides in LiNbo$_3$", By Jackel et al., Appl. Phys. Lett. 41(7); 1 Oct. 1982, pp. 607–608.
"Fabrication & Characterization of Titanum Indiffused Proton Exchanged(TIPE) Waveguides in Lithium Niobate" By Micheli et al., Optics Communication, Vol. 42, No. 2, 15 Jun. 1982, pp. 101–103.
"Single-Mode Integrated Optical 1×N Star Coupler" by Findakly et al. Appl. Phys. Lett. 40(7), 1 Apr. 1982.
I. Yokahama J. Noda, and K. Okamoto, *Fiber-Coupler Fabrication with Automatic Fusion-Elongation Process for Low Excess Loss and High Coupling-Ratio Accuracy* J. Lightwave Tech. LT-5, pp. 910–915 (1987).
B. S. Kawasaki K. O. Hill, and R. G. Lamont *Biconical-Taper Single-Mode Fiber Coupler* Opt. Lett. 6, pp. 327–328 (1981).
M. Kawachi, B. S. Kawasaki, K. O. Hill, and T. Edahiro, *Fabrication of Single-Polarizaiton Single-Mode Fiber Couplers,* Electon. Lett. 18, pp. 962–964 (1982).
M. S. Yataki, D. N. Payne, and M. P. Vahrnam, *All-Fiber Polarizing Beam-Splitter,* Electron, Lett. 21, pp. 249–251 (1985).
T. Bricheno and V. Baker, *All-Fiber Polarization Splitter/Combiner,* Electron Lett. 21, pp. 251 ∝ 252 (1985).
I. Yokahama, K. Okamota, and J. Noda, *Fiber-Optic Polarizing Beamsplitter Employing Birefringent-fiber coupler,* Electron. Lett. 21, pp. 415–416 (1985).
R. A. Berch, G. Kotler, and H. J. Shaw, *Single-mode fiber-optic directional coupler* Electron. Lett. 16, pp. 260–261 (1980).
B. K. Neyer and D. R. Smith, *Monomode polarization maintaining fiber directional couplers,* Opt. Lett. 8, pp. 543–545 (1983).
T. Arikawa, F. Suzuki, Y. Kikuchi, O. Fukada, and K. Inada, *Ultra-low-crosstalk polarization maintaining optical fiber coupler,* Optical Fiber Sensor (OFS) Conf., New Orleans, Jan. 27–29, 1988, paper FEE4-1.
J. L. Jackel, C. E. Rice, and J. J. Veselka, *Proton exchange for high-index waveguides in LiNbO$_3$* Appl. Phys. Lett. 47, pp. 607–608 (1982).
P. G. Suchoski, T. K. Findakly, and F. J. Leonberger, *Low-loss high-extinction polarizers fabricated in LiNbo$_3$ by proton exchange,* To be published in Opt. Lett., Feb. 1988.
P. G. Suchoski, M. M. Abou el leil, T. K. Findakly, and F. J. Leonberger, *Low-loss proton-exchange LiNbo$_3$ waveguides with no electrooptic degradation* To be presented at Integrated and Guided Wave Optics (IGWO) Conf., Santa Fe, Mar. 28–30, 1988.
R. H. Rediker and F. J. Leonberger, *Analysis of integrated-optics near 3 dB coupler and Mach-Zehnder interferometric modulator using four-port scattering matrix,* IEEE J. Quantum Electron. QE-18, pp. 1813–1816 (1982).

*Primary Examiner*—Akm Ullah
*Attorney, Agent, or Firm*—Dominic J. Chiantera

[57] ABSTRACT

An optical power star coupler includes a LiNbO$_3$ or LiTaO$_3$ substrate having a major surface for receiving a circuit array of one or more surface for splitters disposed thereon by a two step proton exchange (TSPE) process, in a geometric pattern to provide an N×M star coupler having high polarization extinction, uniform splitting ratio, and low loss.

12 Claims, 1 Drawing Sheet

INTEGRATED OPTIC STAR COUPLER

CROSS REFERENCE TO RELATED APPLICATIONS

Some of the subject matter disclosed and claimed herein is also disclosed and claimed in one or more of the following commonly owned, copending U.S. Pat. applications filed on even date herewith by Suchoski, Jr. et al, U.S. Ser. No. 07/329,123, entitled *Low-Loss Proton Exchanged Waveguides For Active Integrated Optic Devices*; and Suchoski, Jr. et al, U.S. Ser. No. 07/329,121, entitled *Single-Polarization, Integrated Optical Components For Optical Gyroscopes*.

TECHNICAL FIELD

This invention relates to optical signal star couplers, and more particularly to integrated optic (IO) devices therefor.

BACKGROUND ART

In fiber optic systems, such as fiber-optic gyro (FOG) and coherent optical communication systems, the system's accuracy requires a precise knowledge of the optical signal phase. As an example, the rotation rate in a FOG system based on the Sagnac principle is determined by comparing the optical phases of two optical signals, e.g. light beams, propagating in opposite directions through an interferometric loop. Similarly, in a coherent communication system the information is encoded onto an optical signal by temporally varying the light beam's phase in the transmitter, and the encoded information is decoded at the receiver by comparing the phase of the transmitted light beam to the phase of a reference light beam.

To obtain optimum performance in these phase sensitive systems it is critical that the optical signal in the fiber is linearly polarized, and confined to one of the orthogonal polarization modes. The two orthogonal polarization modes (TM and TE) are not degenerate, i.e. they have slightly different phase velocities. If power is coupled from one polarization mode to the other the optical phase at the FOG detector (or the communication system receiver) will be perturbed. This results in drift errors for the FOG system and increased noise and signal fading in the coherent optical communication system. It is obvious, therefore, that phase sensitive optical systems must be fabricated using optical components which are polarization preserving.

One standard optical component required in each system is a polarization preserving, $N \times M$ star coupler. These N input / M output star couplers may range from, and include, $1 \times M$ splitters to $N \times 1$ multiplexers. The star coupler accepts optical signal power from N inputs, combines the N input powers into a single guide, and then splits the guide output into M equal parts.

The key parameters for the coupler are: (i) the splitting uniformity, (ii) the insertion loss (sum of the M output powers divided by the sum of the N input powers), and (iii) the polarization extinction (the output power in the desired polarization mode divided by the output power in the undesired polarization mode). The ideal coupler would have a uniform splitting ratio, zero excess insertion loss, and infinite polarization extinction.

Some of the prior art polarization preserving star couplers are fiber optic devices, which are fabricated either through the fusion elongation method or the mechanical polishing method. In the fusion elongation method $2 \times 2$ ($N \times N$) star couplers are made by thermally fusing two polarization preserving optic fibers, and then elongating them in the waveguide portion. The cores of the two fibers must be in close proximity when fused so that in operation power transfer can occur between fibers via evanescent coupling.

The polarization axes of the fused fibers must also be perfectly aligned in parallel to preserve polarization modes in this fused coupling region. In the mechanical polishing method, the polished surface of two optic fibers are joined using an index matching liquid bond. Power transfer again occurs through evanescent coupling, so that the fibers must be in close proximity and must be aligned.

Both fabrication methods produce devices which have low excess insertion loss and relatively uniform splitting. However, the polarization extinction ratio is typically degraded due to angular misalignment of the polarization axes of the two fibers, unless the fiber geometry is designed to physically establish the main polarization axis easily, such as with the use of rectangular fibers. For these reasons, fiber star coupler configurations larger than $2 \times 2$ are impractical. One alternative is to cascade a series of $2 \times 2$ couplers to achieve the desired $N \times M$ result. Another alternative is to use feedback looping and tapping.

The prior art IO star couplers are fabricated by cascade arrangement of $1 \times 2$ splitters in tree structures. The splitters may be Y-junctions or directional couplers, and are fabricated on a substrate material. The substrate materials include glass and $LiNbO_3$. For glass substrates the splitter circuitry is deposited on the substrate surface using an ion exchange method. In the case of $LiNbO_3$ substrates, the titanium diffusion method is used to deposit the circuit configuration.

The prior art IO star couplers are polarization maintaining to a degree; similar to the polarization preserving characteristics of the optic fiber couplers. They are not single polarization devices, i.e. they do not have high polarization extinction.

DISCLOSURE OF INVENTION

The object of the present invention is to provide a single polarization IO star coupler.

According to the present invention a single polarization IO star coupler comprises a crystalline material substrate having a star coupler waveguide array formed in a major surface thereof by a two step proton exchange (TSPE) process. In further accord with the present invention, the star coupler waveguide array includes one or more $1 \times 2$ splitters disposed in cascade to provide an array having N number of signal inputs and M number of signal outputs, which are arranged in an $N \times M$ tree architecture. In still further accord with the present invention, each $1 \times 2$ splitter comprises a symmetrical Y-junction node. In still further accord with the present invention, the star coupler substrate material comprises, alternatively, $LiNbO_3$ and $LiTaO_3$. In still further accord with the present invention, the substrate material may include, alternatively, an X-cut Z-cut, and Y-cut crystal orientation.

The $N \times M$ IO star coupler of the present invention includes a waveguide array having a $1 \times 2$ splitter as a basic building block. One or more $1 \times 2$ splitters are arranged in selected geometric patterns on the substrate surface to achieve any desired $N \times M$ splitting or combining transfer functions, as may be known to those skilled in the art.

Preferably, the 1×2 splitter is a symmetrical Y-junction nodes. The Y-junction and connecting waveguide paths are fabricated on either LiNb0$_3$ or LiTa0$_3$ substrate material using a TSPE process. This involves immersion of a patterned array substrate in a concentrate benzoic acid bath, followed by substrate annealing. This provides a star coupler having high polarization extinction to provide a integrated optic (IO) star coupler having a uniform splitting ratio and low loss characteristics.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
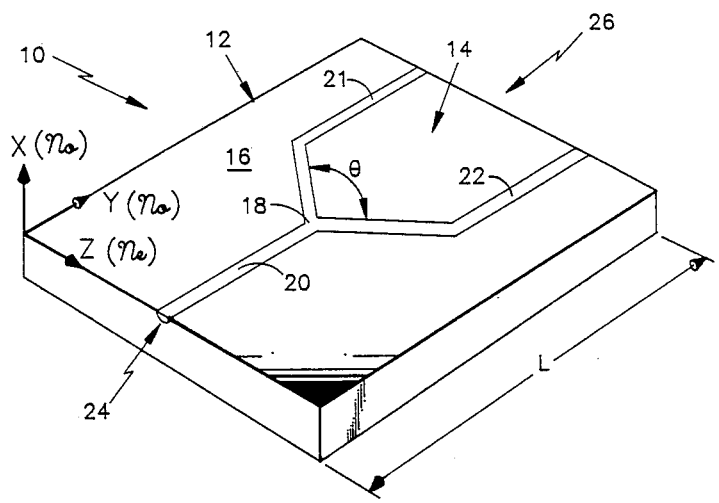
FIG. 1 is a perspective illustration of a basic Y-junction node 1×2 star coupler according to the present invention.

FIG. 1 is a perspective illustration of a 1×2 star coupler 10 according to the present invention. The star coupler includes a crystalline material substrate 12, which provides a refractive medium for a waveguide circuit array 14 disposed on a substrate major surface 16. The substrate material may be either LiNb0$_3$ or LiTa0$_3$. Preferably the substrate has an X-cut crystal orientation, but Z-cut and Y-cut crystal may also be used. The extraordinary index of refraction ($n_e$) for the X-cut crystal lies along the Z axis.

The array 14 includes a Y-junction node 18 and three single mode waveguides 20-22. For purposes of description only, the waveguide 20 shall be referred to as the "single waveguide interface" 24 of the star coupler, i.e. the single signal input side, and the waveguides 21, 22 are termed the "first" and "second" waveguides of the star coupler's "dual waveguide interface" 26. The substrate has an overall length (L) between the interfaces.

If the node is symmetrical and the splitting angle $\theta$ 28 is not too large, i.e. $\theta$ is from 1 to 2 degrees, the optical power in guide 20 is split equally (within device tolerances) into the guides 21, 22. For these same splitting angle conditions, the optical power of signals presented to the guides 21, 22 is combined in the guide 20 to a power level equal the sum of the individual power levels at the guides 21, 22, less the loss occurring in the device, less any additional loss due to phase mismatch or incoherence of the optical signals arriving at the Y-junction.

In the best mode embodiment the Y-junction node is symmetrical; having three equal legs and a splitting angle $\theta$ in the range of 1 to 2 degrees. If the optical signals presented to the guides 21, 22 are not in phase there is a destructive combination of the two signals at the Y node, which may excite other modes in the waveguide 20, causing some portion of the light intensities of the two signals to leak into the substrate 12. Furthermore, if the two signals are not coherent, each will suffer a 3 dB loss upon going through the Y-junction. Therefore, the ideal combiner function of the device is limited to a combination of equally phased coherent signals. This of course is well known to those skilled in the art of integrated optic (IO) devices.

The circuit array is fabricated on the substrate using the two-step proton exchange (TSPE) process disclosed and claimed in a commonly owned, copending patent application of the same assignee, filed on even date herewith by Suchoski et al, entitled: *Low-Loss Proton Exchanged Waveguides for Active Integrated Optic Devices*, U.S. Ser. No. 07/329,123.

Fabrication of the star coupler begins with deposition of a masking layer of material, such as aluminum (Al), chromium (Cr), titanium (Ti), or silicon dioxide (Si0$_2$), on the surface 16. A photoresist film is then deposited on the surface. The resist film is patterned in the desired circuit array geometry. The patterned film is then exposed to ultraviolet light and developed to duplicate the pattern on the masking layer. The surface is then etched to expose the circuit geometry, i.e. the waveguide channels, on the surface. The channel widths vary with the intended guided signal wavelength, but range from 3 to 10 microns. The masking pattern limits the proton exchange to the channel etched areas.

The substrate is then immersed in a concentrated benzoic acid bath for two to sixty minutes. The acid bath is at a temperature of from 150°C to 250°C. Following the bath, the crystal is annealed at an elevated temperature in the range of from 300°C to 400°C, for a period of from one to five hours. The exact set of processing conditions are dependent on the selected substrate material (whether the LiNb0$_3$ or LiTa0$_3$), the selected wavelength, the crystal cut, and the modal dispersion requirements for the combiner.

The TSPE process locally increases the extraordinary refractive index (within the waveguide channels) and locally decreases the ordinary refractive index. As a result, for the FIG. 1 combiner with X-cut orientation, it is possible to support a guided optical mode polarized along the Z axis (extraordinary axis) by total internal reflection.

Figure 2:
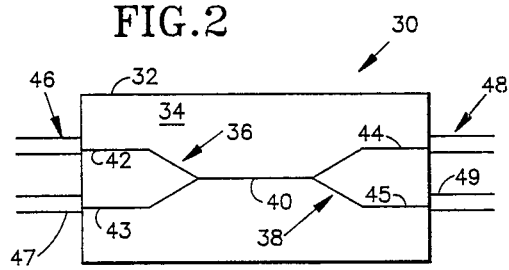
FIG. 2 is a schematic illustration of a 2×2 star coupler using a plurality of the Y-junction nodes illustrated in FIG. 1.

The guides 42-45 in FIG. 2 are shown connected to polarization preserving optic fibers 46-49. Polarization control is achieved by aligning the principal polarization axis of the fibers (46-49) to the ordinary and extraordinary axes of substrate 32. The substrate and mating fiber may be polished at orientations other than normal, to reduce back reflection.

The 1×2 star coupler of FIG. 1, when fabricated with a symmetric Y-junction for operation at wavelengths of 0.82 and 1.55 micron, exhibit propagation loss in the waveguides of from 0.15-0.2 dB/cm at both wavelengths. The excess loss at the Y-junction in the splitting mode is typically 0.4-0.5 dB. Splitting ratios for the guides 21, 22 are on the order of 50 +/− 2%. The fiber-to-fiber insertion loss is 1.2 dB for straight channels and 1.8 dB for Y-junctions when coupling to polarization preserving fibers. The polarization extinction ratio is between 55 and 60 dB on the chip (on the substrate itself without pigtailing to fibers). This represents a 25-30 dB improvement over the all fiber prior art combiner/star couplers.

The basic 1×2 Y-junction star coupler of FIG. 1 may be extended to achieve N×M star coupler structures. FIG. 2 is a schematic illustration of a 2×2 star coupler 30, with substrate 32 of LiNb0$_3$ or LiTa0$_3$, a major surface 34 and two Y-junction nodes 36, 38. The Y-junctions are joined at the single waveguide interface to form a monomode waveguide 40 in the center of the substrate. The dual waveguide interfaces of each Y guide provide input/outputs 42–45.

Figure 3:
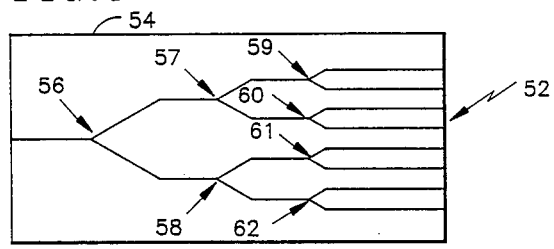
FIG. 3 is a schematic illustration of a 1×8 star coupler using a plurality of the Y-junction nodes illustrated in FIG. 1.

A 1×M power star coupler structure may be fabricated by cascading a plurality of the basic 1×2 Y-junction nodes (of FIG. 1) in a tree architecture. FIG. 3 illustrates a 1×8 star coupler 52. The star coupler includes a substrate 54 of LiNb0$_3$ or LiTa0$_3$, having seven Y-junction nodes 56–62 disposed on the substrate's major surface 64. Although the overall device insertion loss increases by approximately 0.5 dB for each "tree layer", the polarization preserving property of the expanded star coupler structure is not degraded.

A tree layer is defined as each level of Y-junction nodes. In FIG. 3 there are three tree layers. The first level includes the Y-junction 56, the second level includes Y-junctions 57, 58, and the third level includes Y-junctions 59–62. The overall insertion loss also increases by about 0.15 to 0.2 dB for each additional centimeter of chip length (L, FIG. 1).

Figure 4:
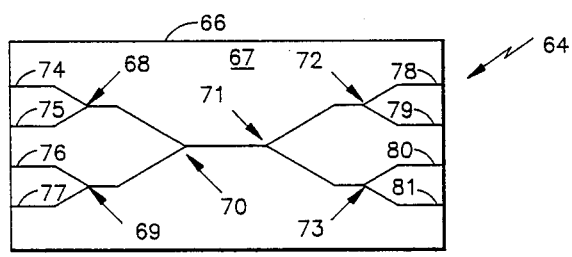
FIG. 4 is a schematic illustration of a 4×4 star coupler using a plurality of the Y-junction nodes illustrated in FIG. 1.

An N×N power star coupler can be achieved by arranging the 1×2 Y-junction nodes in the combination illustrated in FIG. 4. The FIG. 4 structure is a 4×4 star coupler 64 with substrate 66 of LiNb0$_3$ or LiTa0$_3$, a substrate major surface 67, and Y-junction nodes 68–73. The upper level Y-junctions 68, 69 and 72, 73 are connected to the input/output waveguides 74–77 and 78–81, respectively. In this arrangement, in addition to the insertion losses described above (0.5 dB for each tree layer and 0.15–0.2 dB for each centimeter of length) there will be an inherent 3 dB loss for each tree layer in the combining circuitry as a result of reciprocity arguments, i.e. unless precise phase matching and coherence requirements are met.

Although the invention has been shown and described with respect to a best mode embodiment thereof, it should be understood by those skilled in the art that the foregoing and various other changes, omissions, and additions in the form and detail thereof, may be made therein without departing from the spirit and scope of this invention.

We claim:

1. A single polarization integrated optic (IO) star coupler, comprising:

substrate means, comprising a refractive material having a major surface; and star coupler array means, including one or more 1×2 optical power splitter means disposed in cascade on said major surface to provide an array having N number of signal inputs and M number of signal outputs arranged in an N×M star coupler architecture;

as characterized by:

said star coupler array means being formed in said major surface by a two step proton exchange (TSPE) process comprising the steps of:

immersing said substrate, for a period of from two to sixty minutes, in a benzoic acid bath at a temperature of from 150°C to 250°C;

removing said substrate from said bath following said step of immersing; and appealing said substrate for period of from one to five hours at temperature of from 300°C to 400°.

2. The star coupler of claim 1, wherein said IOC substrate material comprises LiNb0$_3$.

3. The star coupler of claim 1, wherein said IOC substrate material comprises LiTa0$_3$.

4. The star coupler of claim 2, wherein said substrate material further comprises X-cut crystal material.

5. The star coupler of claim 3, wherein said substrate material further comprises X-cut crystal material.

6. The star coupler of claim 2, wherein said substrate material further comprises Z-cut crystal material.

7. The star coupler of claim 3, wherein said substrate material further comprises Z-cut crystal material.

8. The star coupler of claim 2, wherein said substrate material further comprises Y-cut crystal material.

9. The star coupler of claim 3, wherein said substrate material further comprises Y-cut crystal material.

10. The star coupler of claim 1, wherein said star coupler array means comprises a plurality of said 1×2 optical power splitter means disposed in cascade to provide an array having one signal input and M number of signal outputs arranged in a 1×M star coupler tree architecture.

11. The star coupler of claim 1, wherein each said 1×2 optical power splitter means comprises a symmetrical Y-junction node.

12. The star coupler of claim 10, wherein each said 1×2 optical power splitter means comprises a symmetrical Y-junction node.

* * * * *

UNITED STATES PATENT AND TRADEMARK OFFICE
CERTIFICATE OF CORRECTION

PATENT NO. : 4,953,935

DATED : September 4, 1990

INVENTOR(S) : Paul G. Suchoski, Jr., Talal K. Findakly
and Frederick J. Leonberger It is certified that error appears in the above-identified patent and that said Letters Patent is hereby corrected as shown below:

Abstract, line 60, "surface for" should read --1 X 2--.

Column 6, line 20, "appealing" should read --annealing--.

Signed and Sealed this

Twenty-eighth Day of April, 1992

Attest:

HARRY F. MANBECK, JR.

*Attesting Officer*  *Commissioner of Patents and Trademarks*